United States Patent
Suga et al.

(10) Patent No.: US 8,593,126 B2
(45) Date of Patent: Nov. 26, 2013

(54) POWER SUPPLY DEVICE, CONTROL CIRCUIT, ELECTRONIC DEVICE AND CONTROL METHOD FOR POWER SUPPLY

(75) Inventors: Shinichiro Suga, Kasugai (JP); Kenta Ido, Kasugai (JP); Tomohiro Suzuki, Kasugai (JP); Hiroaki Sumiya, Kasugai (JP); Katsuyuki Yasukouchi, Kasugai (JP); Takahiro Yoshino, Kasugai (JP)

(73) Assignee: Spansion LLC, Sunnyvale, CA (US)

( * ) Notice: Subject to any disclaimer, the term of this patent is extended or adjusted under 35 U.S.C. 154(b) by 51 days.

(21) Appl. No.: 13/471,604

(22) Filed: May 15, 2012

(65) Prior Publication Data

US 2012/0306465 A1 Dec. 6, 2012

(30) Foreign Application Priority Data

May 31, 2011 (JP) .................................. 2011-122815

(51) Int. Cl.
*G05F 1/575* (2006.01)
*G05F 1/618* (2006.01)

(52) U.S. Cl.
USPC .......................................... 323/285; 323/288

(58) Field of Classification Search
USPC .................... 323/282, 284, 285, 288, 351
See application file for complete search history.

(56) References Cited

U.S. PATENT DOCUMENTS

| 6,885,177 | B2 * | 4/2005 | Fukui .............................. 323/288 |
| 7,045,993 | B1 | 5/2006 | Tomiyoshi |
| 7,777,472 | B2 | 8/2010 | Uehara |
| 8,106,642 | B2 * | 1/2012 | Chen et al. ..................... 323/284 |
| 2008/0203988 | A1 * | 8/2008 | Horikawa et al. .............. 323/282 |
| 2009/0261797 | A1 * | 10/2009 | Shibata ......................... 323/288 |
| 2009/0322299 | A1 * | 12/2009 | Michishita et al. ........... 323/282 |
| 2011/0241632 | A1 * | 10/2011 | Yashiki ......................... 323/268 |

FOREIGN PATENT DOCUMENTS

| JP | 11-4574 | 1/1999 |
| JP | 2005-269807 | 9/2005 |
| JP | 2008-206238 | 9/2008 |
| JP | 2010-51073 | 3/2010 |
| JP | 2010-207022 | 9/2010 |

\* cited by examiner

*Primary Examiner* — Gary L Laxton
(74) *Attorney, Agent, or Firm* — Sterne, Kessler, Goldstein & Fox, P.L.L.C.

(57) ABSTRACT

A power supply device that includes a switch circuit to which an input voltage is supplied, a coil coupled between the switch circuit and an output terminal from which an output voltage is outputted. A voltage adding circuit adds a slope voltage to a reference voltage. A control unit compares a feedback voltage corresponding to the output voltage and the reference voltage and switches the switch circuit at a timing corresponding to a comparison result of the feedback voltage and the reference voltage. A slope adjustment circuit differentiates a current flowing in the coil and adjusts a slope amount of the slope based on a differentiation result of the current.

9 Claims, 14 Drawing Sheets

POWER SUPPLY DEVICE, CONTROL CIRCUIT, ELECTRONIC DEVICE AND CONTROL METHOD FOR POWER SUPPLY

CROSS-REFERENCE TO RELATED APPLICATIONS

This application is based upon and claims the benefit of priority from prior Japanese Patent Application No. 2011-122815, filed on May 31, 2011, the entire contents of which are incorporated herein by reference.

FIELD

The embodiments relate to a power supply device, a control circuit, an electronic device and a control method for power supply.

BACKGROUND

In electronic devices and the like, a switching power supply is used to supply power to a load. For example, a DC-DC converter for converting a direct-current voltage into another direct-current voltage is used. A comparator type DC-DC converter is known as a DC-DC converter capable of responding to a sudden change of a load at a high speed (for example, see, Japanese Laid-Open Patent Publications No. 2010-51073).

FIG. 15 illustrates an example of a comparator type DC-DC converter. The illustrated DC-DC converter 4 includes a converter unit 5 and a control circuit 6. The converter unit 5 includes transistors T11, T12, a coil L11 and a capacitor C11.

A comparator 80 in the control circuit 6 receives a reference voltage VR11 and a feedback voltage VFB corresponding to the output voltage Vo. The feedback voltage VFB represents a voltage obtained by superposing an alternating-current component of an output voltage Vo on a divided voltage obtained by dividing the output voltage Vo by resistors R11, R12 through a capacitor C12 coupled in parallel to the resistor R11. The comparator 80 compares the feedback voltage VFB and the reference voltage VR11 and outputs an output signal S11 of a level corresponding to the comparison result to a set terminal S of an RS-flip-flop (RS-FF circuit) 81. An oscillator 82 outputs a clock signal CLK having a constant frequency to a reset terminal R of the RS-FF circuit 81.

The RS-FF circuit 81 is reset in response to an H-level clock signal CLK and outputs an L-level output signal S12. In response to the L-level output signal S12, a driver circuit 83 outputs H-level control signals DH, DL to turn off the transistor T11 and turn on the transistor T12. At this time, a switch circuit SW11 is turned off in response to the L-level output signal S12 output from the RS-FF circuit 81. Then, the capacitor C12 is charged according to a current I11 supplied from a current source 84, wherefore the reference voltage VR11 increases with a constant slope (=I11/C12) from a standard voltage VR0.

When the reference voltage VR11 becomes higher than the feedback voltage VFB, the comparator 80 outputs an H-level signal S11. In response to the H-level signal S11, the RS-FF circuit 81 is set and outputs an H-level output signal S12. Then, the driver circuit 83 outputs L-level control signals DH, DL to turn on the transistor T11 and turn off the transistor T12.

As described, in the comparator type DC-DC converter 4, the feedback voltage VFB corresponding to the output voltage Vo and the reference voltage VR11 are constantly compared by the comparator 80 and the main transistor T11 is immediately switched according to the comparison result. Thus, the comparator type DC-DC converter 4 responds to a sudden change of a load at a high speed.

In DC-DC converters of recent years, further miniaturization is required with a movement toward higher frequency characteristics. To meet such a miniaturization requirement, a multilayer chip coil is used as the coil L11. However, the multilayer chip coil generally has a poor direct-current superposition characteristic. Thus, if a current flowing in the coil L11 varies due to a variation of an output current Io, an inductance value of the coil L11 accordingly varies. Then, there arises a problem that frequency characteristics (frequency band and phase margin) of the DC-DC converter change due to the variation of the inductance value. Particularly, when a current flowing in the coil L11 increases, the inductance value of the coil L11 decreases and the frequency band spreads toward a high-frequency side, wherefore there arises a problem of reducing a phase margin.

SUMMARY

According to an aspect of the embodiment, a power supply device includes a switch circuit to which an input voltage is supplied. A coil is coupled between the switch circuit and an output terminal from which an output voltage is outputted. A voltage adding circuit adds a slope voltage to a reference voltage. A control unit compares a feedback voltage corresponding to the output voltage and the reference voltage and switches the switch circuit at a timing corresponding to a comparison result of the feedback voltage and the reference voltage. A slope adjustment circuit differentiates a current flowing in the coil and adjusts a slope amount of the slope based on a differentiation result of the current.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF DRAWINGS

The embodiment, together with objects and advantages thereof, may best be understood by reference to the following description of the presently preferred embodiments together with the accompanying drawings in which.

DESCRIPTION OF EMBODIMENTS

Figure 1:
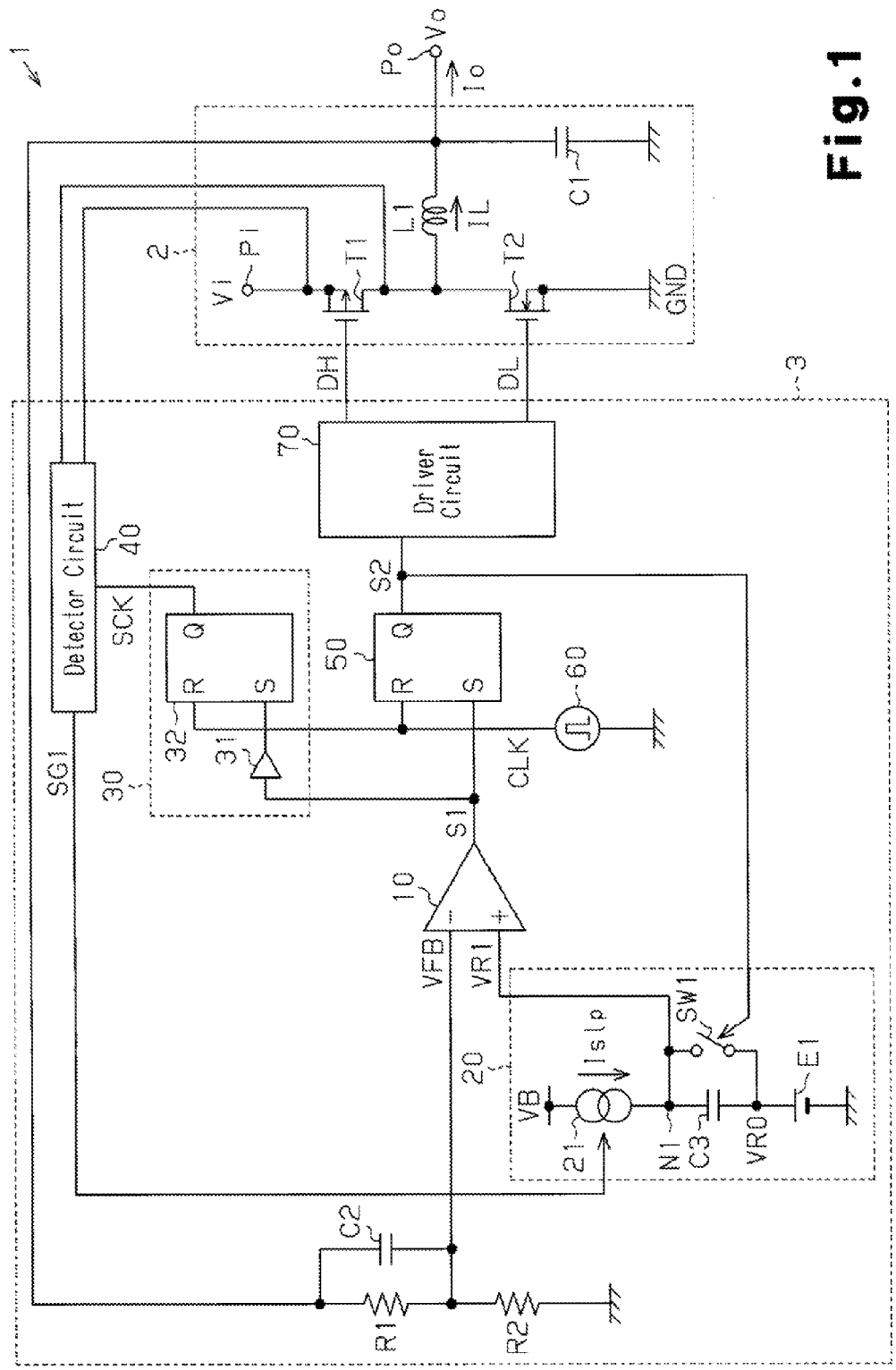
FIG. 1 is a block circuit diagram illustrating a DC-DC converter of one embodiment.

A DC-DC converter according to one embodiment will be described with reference to FIGS. 1 to 12. As illustrated in FIG. 1, a DC-DC converter 1 includes a converter unit 2 and a control circuit 3 for controlling the converter unit 2. The converter unit 2 generates an output voltage Vo (e.g. 1.0 V) lower than an input voltage Vi (e.g. 3.6 V) based on the input voltage Vi First, an internal configuration example of the converter unit 2 is described. A main transistor T1 and a synchronization transistor T2 are coupled in series between an input terminal Pi to which an input voltage Vi is to be supplied and a power supply line (here, ground GND) having a lower potential than the input voltage Vi. In the illustrated embodiment, the main transistor T1 is a P-channel MOS transistor and the synchronization transistor T2 is an N-channel MOS transistor.

A first terminal, or source, of the transistor T1 is coupled to the input terminal Pi. A second terminal, or drain, of the transistor T1 is coupled to a first terminal, or drain, of the transistor T2. A second terminal, or source, of the transistor T2 is coupled to the ground GND.

A control signal DH is supplied to a control terminal (gate) of the transistor T1 from the control circuit 3, whereas a control signal DL is supplied to a control terminal (gate) of the transistor T2 from the control circuit 3. The transistors T1, T2 are complementarily turned on and off in response to the control signals DH, DL.

A node between the both transistors T1, T2 is coupled to a first terminal of a coil L1. A second terminal of the coil L1 is coupled to an output terminal Po for outputting an output voltage Vo. In this way, the main transistor T1 and the coil L1 are coupled in series between the input terminal Pi and the output terminal Po. The second terminal of the coil L1 is coupled to a first terminal of a capacitor C1 and a second terminal of the capacitor C1 is coupled to the ground GND. The capacitor C1 is included in a smoothing circuit for smoothing the output voltage Vo. In the illustrated embodiment, a multilayer chip coil is, for example, used as the coil L1.

In such a converter unit 2, a coil current IL corresponding to a potential difference between the input voltage Vi and the output voltage Vo flows in the coil L1 when the main transistor T1 is turned on and the synchronization transistor T2 is turned off. In this way, energy is stored in the coil L1. A slope Slp1 (see FIG. 2) of the coil current IL at this time may be expressed as follows if L denotes an inductance value of the coil L1.

$$Slp1 = \frac{Vi - Vo}{L} \quad (1)$$

On the other hand, the energy stored in the coil L1 is released when the main transistor T1 is turned off and the synchronization transistor T2 is turned on. Thus, an induction current (coil current IL) flows in the coil L1. A slope Slp2 (see FIG. 2) of the coil current IL at this time may be expressed as follows.

$$Slp2 = \frac{Vo}{L} \quad (2)$$

By such an operation, the output voltage Vo lower than the input voltage Vi is generated in the converter unit 2. Then, the output voltage Vo is supplied to a load (not illustrated) coupled to the output terminal Po. In the illustrated embodiment, an output current Io is also supplied to the load.

The control circuit 3 adjusts the pulse widths of the control signals DH, DL based on the output voltage Vo fed back from the converter unit 2. The control circuit 3 includes resistors R1, R2, a comparator 10, a reference voltage generation circuit 20, a clock generation circuit 30, a detector circuit 40, a RS-flip-flop circuit (RS-FF circuit) 50, an oscillator 60 and a driver circuit 70.

The output terminal Po of the converter unit 2 is coupled to the ground GND via the resistors R1, R2. A capacitor C2 for phase compensation (phase advance compensation) is coupled in parallel to the resistor R1. A coupling point between the resistor R1 (capacitor C2) and the resistor R2 is coupled to an inverting input terminal of the comparator 10. In this way, a feedback voltage VFB obtained by superposing an alternating-current component (fluctuation component) of the output voltage Vo on a divided voltage obtained by dividing the output voltage Vo by the resistors R1, R2 is supplied to the inverting input terminal of the comparator 10.

A reference voltage VR1 output from the reference voltage generation circuit 20 is supplied to a non-inverting input terminal of the comparator 10.

The reference voltage generation circuit 20 includes a current source 21, a capacitor C3, a switch circuit SW1 and a standard power supply E1.

The current source 21 generates a current Islp having a current value based on a control signal SG1 output from the detector circuit 40. A first terminal of the current source 21 is coupled to a power supply line to which a bias voltage VB is supplied, and a second terminal thereof is coupled to a first terminal of the capacitor C3. In the illustrated embodiment, the bias voltage VB is, for example, a voltage generated by an unillustrated power supply circuit or the input voltage Vi. A second terminal of the capacitor C3 is coupled to a positive terminal of the standard power supply E1 and a negative terminal of the standard power supply E1 is coupled to the ground GND. The standard power supply E1 generates a standard voltage VR0 whose voltage value is set according to a target value of the output voltage Vo. The switch circuit SW1 is coupled in parallel to the capacitor C3. The switch circuit SW1 is turned on and off in response to an output signal S2 of the RS-FF circuit 50. The switch circuit SW1 is, for example, an N-channel MOS transistor.

The first terminal (node N1) of the capacitor C3 is coupled to the non-inverting input terminal of the comparator 10 and a potential at the first terminal of the capacitor C3 is supplied as the reference voltage VR1 to the non-inverting input terminal of the comparator 10.

Since the both terminals of the capacitor C3 are shorted when the switch circuit SW1 is turned on, the potential at the first terminal of the capacitor C3 becomes equal to the standard voltage VR0 generated by the standard power supply E1. That is, in this case, the standard voltage VR0 is supplied as the reference voltage VR1 to the non-inverting input terminal of the comparator 10.

On the other hand, when the switch circuit SW1 is turned off, a potential difference between the both terminals of the capacitor C3 increases according to the current Islp supplied from the current source 21. The amount of change of the potential difference is proportional to the current Islp. At this time, a potential at the second terminal of the capacitor C3 is the standard voltage VR0. Accordingly, the potential at the first terminal of the capacitor C3 is a potential obtained by superposing the potential difference between the both terminals of the capacitor C3 on the standard voltage VR0. The potential at the first terminal of the capacitor C3 is supplied as the reference voltage VR1 to the non-inverting input terminal of the comparator 10.

Accordingly, the reference voltage VR1 is a constant first voltage (i.e. standard voltage VR0) while the switch circuit SW1 is on and increases with a certain gradient from the first voltage when the switch circuit SW1 is turned off. In other words, the reference voltage VR1 is a voltage obtained by adding a slope increasing with a certain gradient to the standard voltage VR0. The reference voltage VR1 includes a constant voltage and a sloped voltage.

The comparator 10 generates a signal S1 corresponding to a comparison result of the feedback voltage VFB and the reference voltage VR1. For example, the comparator 10 generates an L-level signal S1 when the feedback voltage VFB is higher than the reference voltage VR1 and generates an H-level signal S1 when the feedback voltage VFB is lower than the reference voltage VR1. The signal S1 is supplied to the clock generation circuit 30 and a set terminal S of the RS-FF circuit 50.

The clock generation circuit 30 includes a delay circuit 31 and an RS-FF circuit 32. The signal S1 is supplied to the delay circuit 31 from the comparator 10. The delay circuit 31 delays the signal S1 by a certain time and outputs the delayed signal to a set terminal S of the RS-FF circuit 32.

The oscillator 60 is coupled to a reset terminal R of the RS-FF circuit 32. The oscillator 60 generates a clock signal CLK having a certain frequency (e.g. signal having pulses generated at a constant frequency). The RS-FF circuit 32 outputs an H-level clock signal SCK from an output terminal Q in response to the H-level signal S1 supplied to the set terminal S. The RS-FF circuit 32 outputs an L-level clock signal SCK in response to the H-level clock signal CLK supplied to the reset terminal R. The clock signal SCK output from the RS-FF circuit 32 is supplied to the detector circuit 40.

Both terminals (source and drain) of the main transistor T1 are coupled to the detector circuit 40. The detector circuit 40 detects the slope of the coil current IL flowing in the coil L1 while the transistor T1 is on (ON-period) and generates a control signal SG1 for causing the current source 21 to generate a current Islp having a current value corresponding to the detected slope. For example, the detector circuit 40 generates the control signal SG1 for the generation of the current Islp proportional to the detected slope of the coil current IL.

Since the slope of the coil current IL is inversely proportional to the inductance value L of the coil L1 as is clear from equation (1), the current value of the current Islp is inversely proportional to the inductance value L of the coil L1. In this way, the amount of change of the slope generated by the current Islp is proportional to the slope of the coil current IL and inversely proportional to the inductance value L of the coil current IL.

The oscillator 60 is coupled to the reset terminal of the RS-FF circuit 50. The RS-FF circuit 50 outputs an H-level output signal S2 from the output terminal Q in response to the H-level signal S1 supplied to the set terminal S. The RS-FF circuit 50 outputs an L-level output signal S2 in response to the H-level clock signal CLK supplied to the reset terminal R. That is, for the RS-FF circuit 50, the H-level signal S1 is a set signal and the H-level clock signal CLK is a reset signal. Then, the output signal S2 output from the RS-FF circuit 50 is supplied to the driver circuit 70 and the switch circuit SW1 of the reference voltage generation circuit 20.

The driver circuit 70 generates the control signals DH, DL for complementarily turning on and off the transistors T1, T2 of the converter unit 2 based on the output signal S2 from the RS-FF circuit 50. For example, the driver circuit 70 generates L-level control signals DH, DL in response to the H-level output signal S2 and generates H-level control signals DH, DL in response to the L-level output signal S2. The main transistor T1 is turned on in response to the L-level control signal DH while being turned off in response to the H-level control signal DH. Similarly, the synchronization transistor T2 is turned on in response to the H-level control signal DL while being turned off in response to the L-level control signal DL. In an embodiment, the driver circuit 70 may have dead times set for the control signals DH, DL so that the both transistor T1, T2 are not simultaneously turned on.

Figure 2:
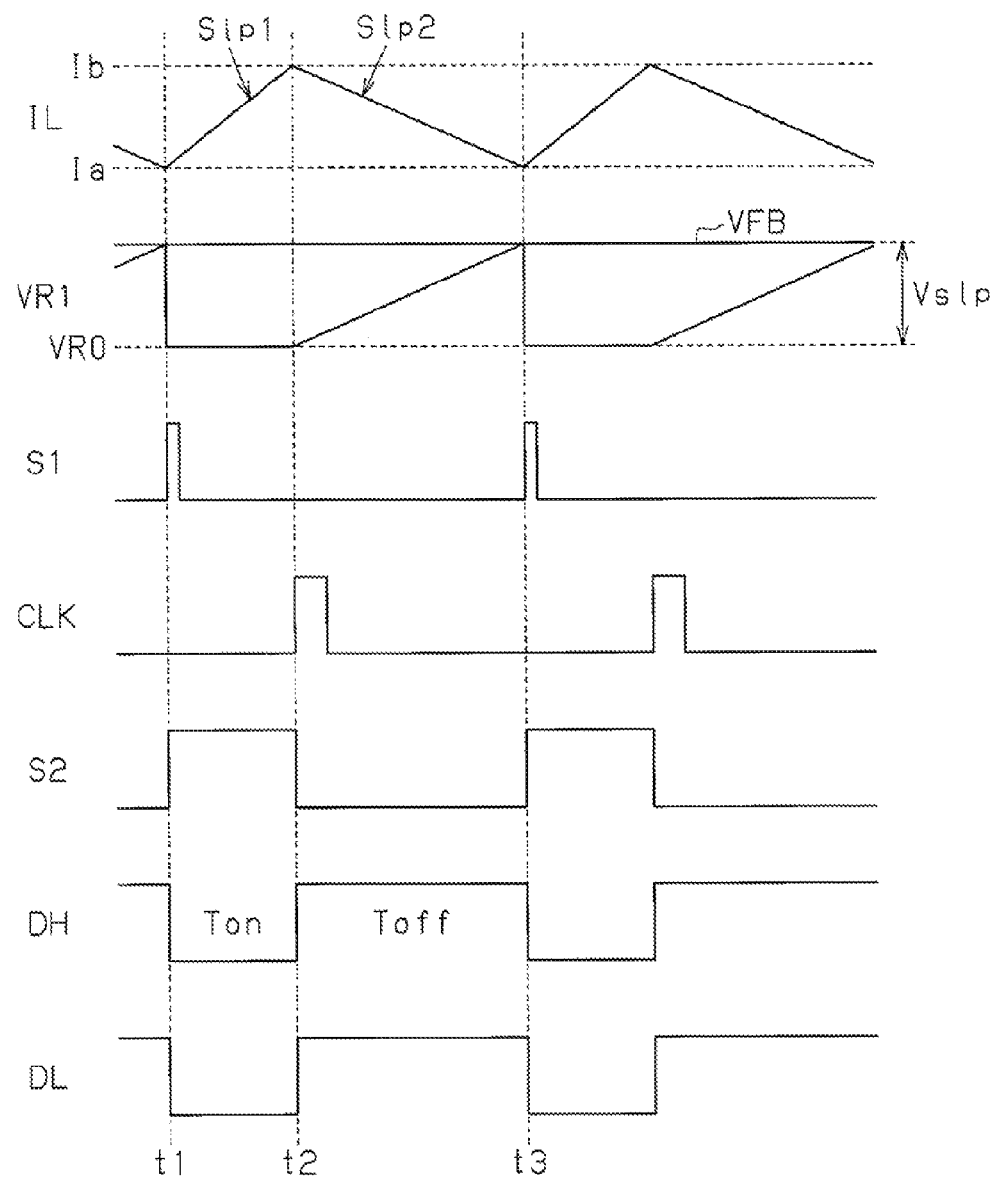
FIG. 2 is a timing chart illustrating the operation of a control circuit.

In such a control circuit 3, an H-level signal S1 is output from the comparator 10 when the reference voltage VR1 becomes higher than the feedback voltage VFB (see time t1 of FIG. 2). The RS-FF circuit 50 outputs an H-level output signal S2 in response to the H-level signal S1. The driver circuit 70 generates L-level control signals DH, DL in response to the H-level output signal S2. Then, the main transistor T1 is turned on in response to the L-level control signal DH and the synchronization transistor T2 is turned off in response to the L-level control signal DL. In this way, the control circuit 3 generates an H-level control signal DH for turning on the main transistor T1 when the reference voltage VR1 crosses the feedback voltage VFB. In other words, an ON-timing of the transistor T1 is set according to the comparison result of the output voltage Vo and the reference voltage VR1. In the following description, a period during which the main transistor T1 is on is referred to as an ON-period (Ton) (see times t1 to t2).

If an H-level output signal S2 is output from the RS-FF circuit 50 as described above (time t1), the switch circuit SW1 in the reference voltage generation circuit 20 is turned on. Then, the first and second terminals of the capacitor C3 are shorted. This causes electric charges stored in the capacitor C3 to be released and the voltage at the first terminal (node N1) of the capacitor C3, i.e. the reference voltage VR1 is reset to the voltage at the second terminal of the capacitor C3. Thus, the reference voltage VR1 during the ON-period of the transistor T1 is a constant level equal to the standard voltage VR0 (times t1 to t2).

If the reference voltage VR1 is reset to the voltage at the second terminal of the capacitor C3 as described above, in other words, if the reference voltage VR1 becomes lower than the feedback voltage VFB, an L-level signal S1 is output from the comparator 10. That is, the signal S1 from the comparator 10 is output at H-level only during a delay period from a point of time (time t1) at which the reference voltage VR1 becomes higher than the feedback voltage VFB to a point of time at which an H-level output signal S2 is output from the RS-FF circuit 50, the switch circuit SW1 is turned on and the reference voltage VR1 becomes lower than the feedback voltage VFB due to the discharge of the reference voltage VR1.

Subsequently, an H-level clock signal CLK is output with a constant period from the oscillator 60 (time t2). In response to the H-level clock signal CLK, the RS-FF circuit 50 outputs an L-level output signal S2. The driver circuit 70 generates H-level control signals DH, DL in response to the L-level output signal S2. Then, the main transistor T1 is turned off in response to the H-level control signal DH and the synchronization transistor T2 is turned on in response to the H-level control signal DL. In this way, the control circuit 3 generates an H-level control signal DH for turning off the main transistor T1 with every constant period. In the following description, a period during which the main transistor T1 is off is referred to as an OFF-period (Toff) (see times t2 to t3).

If an L-level output signal S2 is output from the RS-FF circuit 50 as described above (time t2), the switch circuit SW1 in the reference voltage generation circuit 20 is turned off. Then, the capacitor C3 is charged by the current Islp supplied from the current source 21. This causes the reference voltage VR1 to increase with a gradient corresponding to the current Islp during the OFF-period of the transistor T1 as illustrated at times t2 to t3. For example, a voltage increasing with the gradient corresponding to the current Islp during the OFF-period is added to the standard voltage VR0 and the added voltage is supplied as the reference voltage VR1 to the comparator 10. Thus, the reference voltage VR1 at a certain time t, for example, from time t2 as a starting time during the OFF-period of the transistor T1 may be expressed as follows.

$$VR1 = VR0 + \frac{Islp}{C3} \times t \qquad (3)$$

In the reference voltage VR1, as is clear from equation (3), a slope amount (amplitude of the slope) in the second term of the right side of equation (3) to be added to the standard voltage VR0 increases and decreases as the current Islp generated in the current source 21 increases and decreases.

When the reference voltage VR1 crosses the feedback voltage VFB again (time t3), the control circuit 3 turns on the main transistor T1. By repeating such an operation, the output voltage Vo is maintained at a target voltage corresponding to the standard voltage VR0.

Next, a configuration example and the operation of the detector circuit 40 are described with reference to FIGS. 3 and 4.

Figure 3:
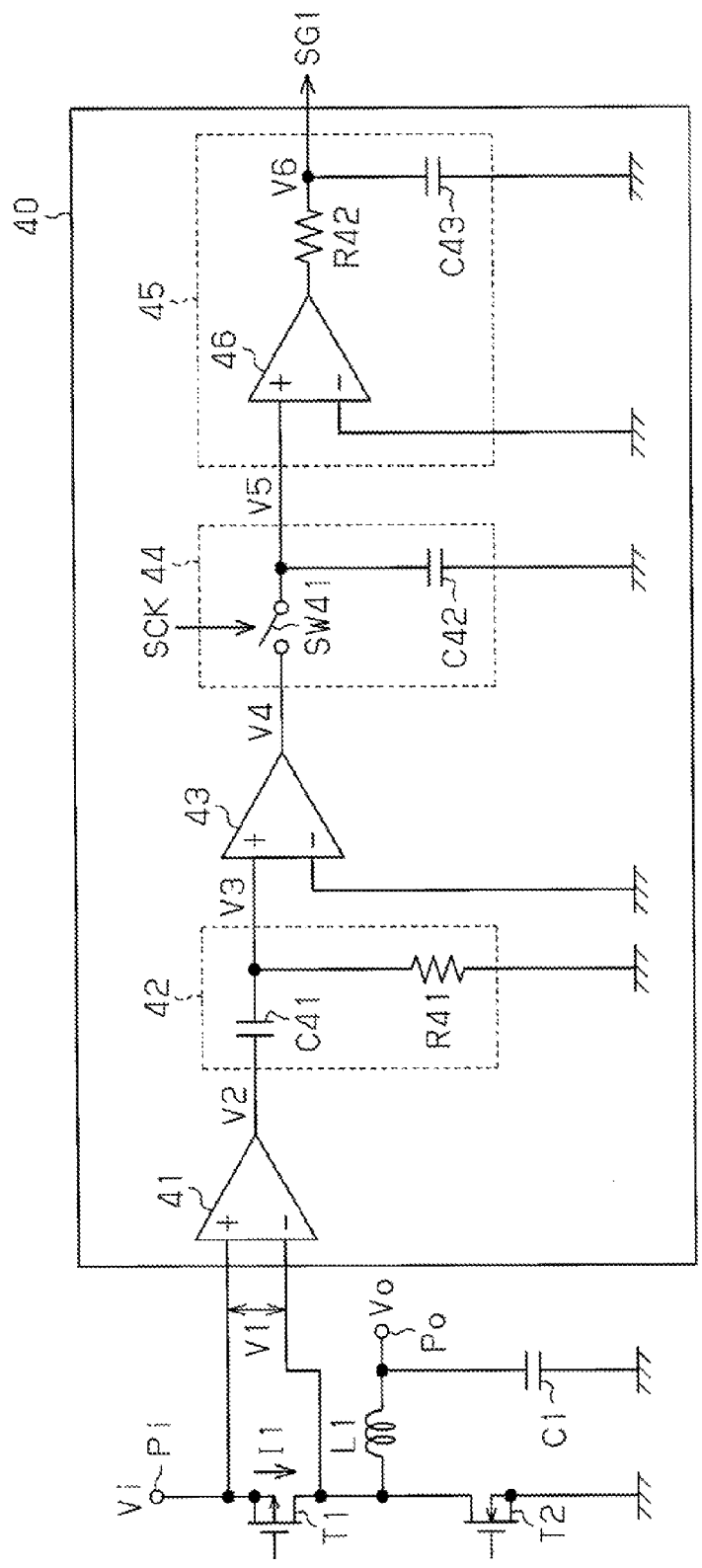
FIG. 3 is a circuit diagram illustrating a configuration example of a detector circuit.
Figure 4:
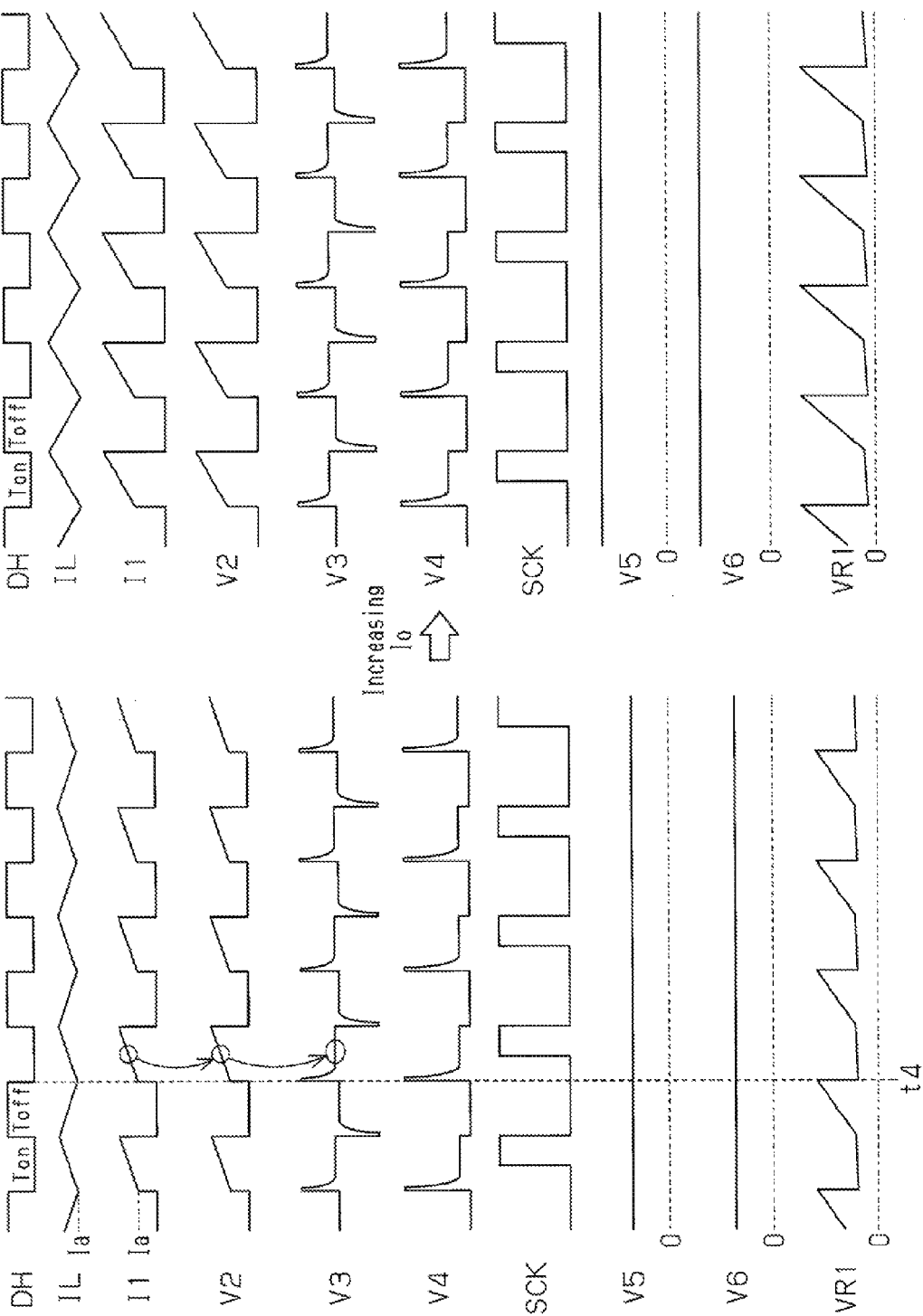
FIG. 4 is a timing chart illustrating the operation of the detector circuit.

As illustrated in FIG. 3, the detector circuit 40 includes an amplifier circuit 41 for converting a current I1 flowing in the transistor T1 into a voltage value, a differentiating circuit 42 for differentiating an output voltage of the amplifier circuit 41, an amplifier circuit 43 for amplifying an output voltage of the differentiating circuit 42, a hold circuit 44 for holding an output voltage of the amplifier circuit 43 and an integration circuit 45 for averaging an output voltage of the hold circuit 44.

A non-inverting input terminal of the amplifier circuit 41 is coupled to the first terminal (e.g. source) of the transistor T1 and an inverting input terminal thereof is coupled to the second terminal (e.g. drain) of the transistor T1. An output terminal of the amplifier circuit 41 is coupled to a first terminal of a capacitor C41 in the differentiating circuit 42. The amplifier circuit 41 detects the current I1 flowing in the transistor T1 based on a first voltage V1 between the both terminals of the transistor T1, converts the current I1 into a voltage value and outputs a second voltage V2 after conversion to the differentiating circuit 42. The current I1 detected is equivalent to the coil current IL during the ON-period of the transistor T1 as illustrated in FIG. 4. Accordingly, the current I1 detected here may be expressed as follows at a certain time t, for example, from time t4 of FIG. 4 as a starting time.

$$I1 = \frac{Vi - Vo}{L} \times t + Ia \qquad (4)$$

The first voltage V1 may be expressed as follows if Ron denotes ON-resistance of the transistor T1.

$$V1 = I1 \times Ron \qquad (5)$$

$$V1 = \left(\frac{Vi - Vo}{L} \times t + Ia\right) \times Ron$$

The second voltage V2 may be expressed as follows if A1 denotes an amplification factor of the amplifier circuit 41.

$$V2 = A1 \times V1 \qquad (6)$$

$$V2 = A1 \times \left(\frac{Vi - Vo}{L} \times t + Ia\right) \times Ron$$

As illustrated in FIG. 3, a second terminal of the capacitor C41 in the differentiating circuit 42 is coupled to a first terminal of a resistor R41. A second terminal of the resistor R41 is coupled to the ground GND. A coupling point between the capacitor C41 and the resistor R41 is coupled to a non-inverting input terminal of the amplifier circuit 43. In this way, the differentiating circuit 42 is a high-pass filter including the capacitor C41 and the resistor R41. The differentiating circuit 42 differentiates the second voltage V2 from the amplifier circuit 41 and outputs a differentiated waveform as a third voltage V3 to the amplifier circuit 43. For example, as illustrated in FIG. 4, a differentiated waveform whose level suddenly changes in response to a sudden voltage change (see, for example, time t4) of the second voltage V2 at the start of the ON-period of the main transistor T1 is output from the differentiating circuit 42. The differentiated waveform gradually converges to a stable level from a voltage level differentiated by the above sudden voltage change as a peak. The stable voltage level (see a circle of FIG. 4) corresponds to the slope (see a circle of FIG. 4) of the second voltage V2. That is, the stable voltage level increases as the slope of the second voltage V2 increases. The slope of the second voltage V2 corresponds to (is proportional to) the slope of the coil current IL during the ON-period of the transistor T1. Thus, in the differentiating circuit, it is possible to detect the slope of the second voltage V2 and the slope (rate of change) of the coil current IL during the ON-period of the transistor T1. The third voltage V3 output from the differentiating circuit 42 may be expressed as follows.

$$V3 = C41 \times R41 \times \frac{dV2}{dt} \quad (7)$$

$$V3 = C41 \times R41 \times \left(A1 \times \frac{Vi - Vo}{L} \times Ron\right)$$

As illustrated in FIG. 3, the ground GND is coupled to an inverting input terminal of the amplifier circuit 43. An output terminal of the amplifier circuit 43 is coupled to a first terminal of a switch circuit SW41 in the hold circuit 44. The amplifier circuit 43 amplifies a difference voltage between terminal voltages of both input terminals, i.e. the third voltage V3 by a certain amplification factor A2 and outputs an amplified fourth voltage V4 to the hold circuit 44. For example, an upper limit value and a lower limit value for the fourth voltage V4 are set in the amplifier circuit 43. Thus, as illustrated in FIG. 4, the voltage value of the fourth voltage V4 is limited to the upper limit value if the voltage after amplification is above the upper limit value and limited to the lower limit value if the voltage after amplification is below the lower limit value. In this way, amplitude of the fourth voltage V4 becoming unnecessarily large may be suppressed. The amplifier circuit 43 also functions as a circuit for separating the differentiating circuit 42 and the hold circuit 44.

As illustrated in FIG. 3, a second terminal of the switch circuit SW41 in the hold circuit 44 is coupled to a first terminal of a capacitor C42. A second terminal of the capacitor C42 is coupled to the ground GND. A coupling point between the switch circuit SW41 and the capacitor C42 is coupled to a non-inverting input terminal of an amplifier circuit 46 in the integration circuit 45.

The switch circuit SW41 is on-off controlled in accordance with a clock signal SCK supplied from the clock generation circuit 30. For example, the switch circuit SW41 is turned on in response to an H-level clock signal SCK and turned off in response to an L-level clock signal SCK.

Figure 5:
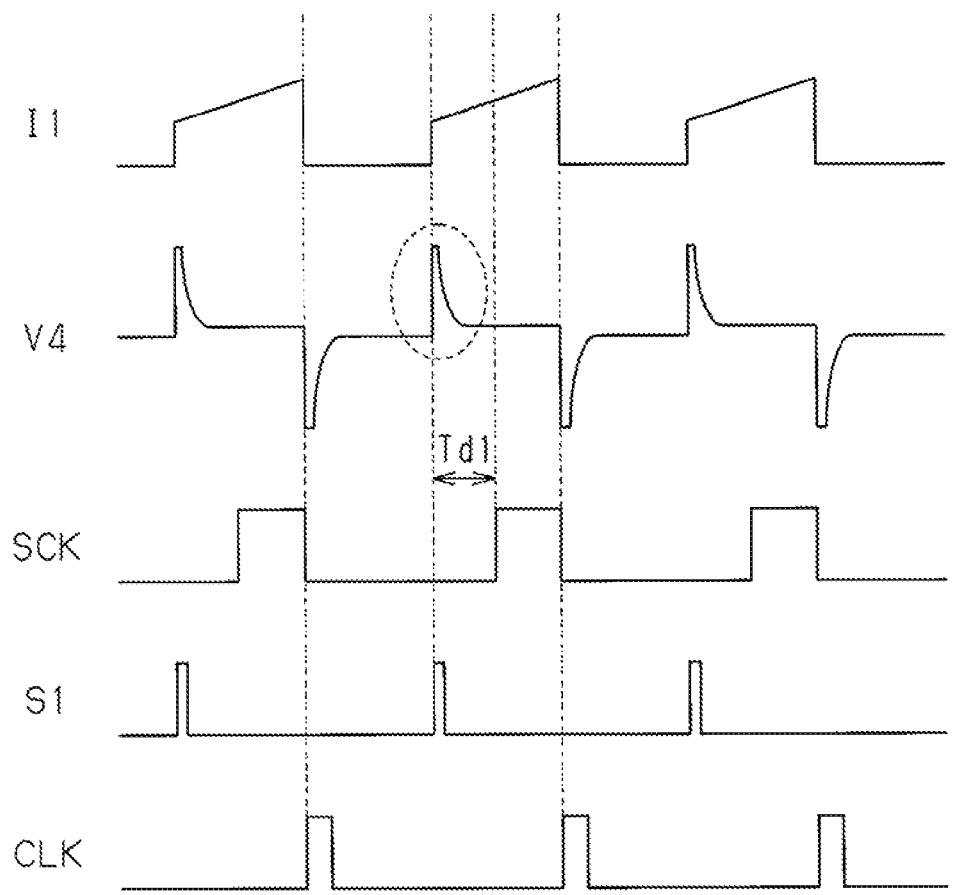
FIG. 5 is a timing chart illustrating the operation of a clock generation circuit.

The hold circuit 44 generates a fifth voltage V5 by sample-holding the fourth voltage V4 from the amplifier circuit 43 in response to the clock signal SCK. For example, as illustrated in FIG. 4, the hold circuit 44 outputs the fourth voltage V4 input from the amplifier circuit 43 as the fifth voltage V5 to the integration circuit 45 while an H-level clock signal SCK is input. The hold circuit 44 holds the fourth voltage V4 input immediately before the fall of the clock signal SCK and outputs the held fourth voltage V4 as the fifth voltage V5 to the integration circuit 45 while an L-level clock signal SCK is input. As illustrated in FIG. 5, the clock signal SCK functioning as a sampling clock rises to H-level at a timing at which the fourth voltage V4 having a stable voltage level may be sampled while avoiding the overshoot (see a part encircled by broken line) of the fourth voltage V4 that occurs at the instance when the transistor T1 is turned on. In the embodiment, the clock signal SCK is transitioned to H-level by the delay circuit 31 (see FIG. 1) of the clock generation circuit 30 after the elapse of a certain time Td1 (i.e. time with a sufficient margin for the above overshoot) from the rise edge of the H-level signal S1 for turning on the transistor T1. The clock signal SCK is transitioned to L-level in response to the fall edge of the H-level clock signal CLK for turning off the transistor T1. Accordingly, the fifth voltage V5 sampled by such a clock signal SCK is equivalent to the stable voltage level of the fourth voltage V4 (third voltage V3), proportional to the slope of the second voltage V2 and the slope of the coil current IL during the ON-period of the transistor T1. That is, if V4 denotes the stable voltage level of the fourth voltage V4, the fifth voltage V5 may be expressed as follows.

$$V5 = V4 \quad (8)$$

$$V5 = A2 \times V3$$

$$V5 = A2 \times C41 \times R41 \times \left(A1 \times \frac{Vi - Vo}{L} \times Ron\right)$$

$$V5 = A1 \times A2 \times C41 \times R41 \times Ron \times \frac{Vi - Vo}{L}$$

As is clear from the equation, the fifth voltage V5 is inversely proportional to the inductance value of the coil L1.

As illustrated in FIG. 3, the integration circuit 45 includes a low-pass filter with the amplifier circuit 46, a resistor R42 and a capacitor C43. The ground GND is coupled to an inverting input terminal of the amplifier circuit 46. An output terminal of the amplifier circuit 46 is coupled to a first terminal of the resistor R42. The amplifier circuit 46 is a buffer which functions, for example, as a voltage follower, and is an operational amplifier having an amplification factor A3 of "1".

A second terminal of the resistor R42 is coupled to a first terminal of the capacitor C43, and a second terminal of the capacitor C43 is coupled to the ground GND. The control signal SG1 is output from a coupling point between the resistor R42 and the capacitor C43. The integration circuit 45 integrates the fifth voltage V5 from the hold circuit 44 and supplies an integrated voltage V6 as the control signal SG1 to the current source 21. By the integration circuit 45, the fifth voltage V5 is accumulated and averaged to reduce noise of the fifth voltage V5.

The voltage value V6 of the control signal SG1 generated in such a detector circuit 40 may be expressed by the following equation.

$$V6 = A3 \times V5 \quad (9)$$

$$V6 = A1 \times A2 \times A3 \times C41 \times R41 \times Ron \times \frac{Vi - Vo}{L}$$

Figure 6:
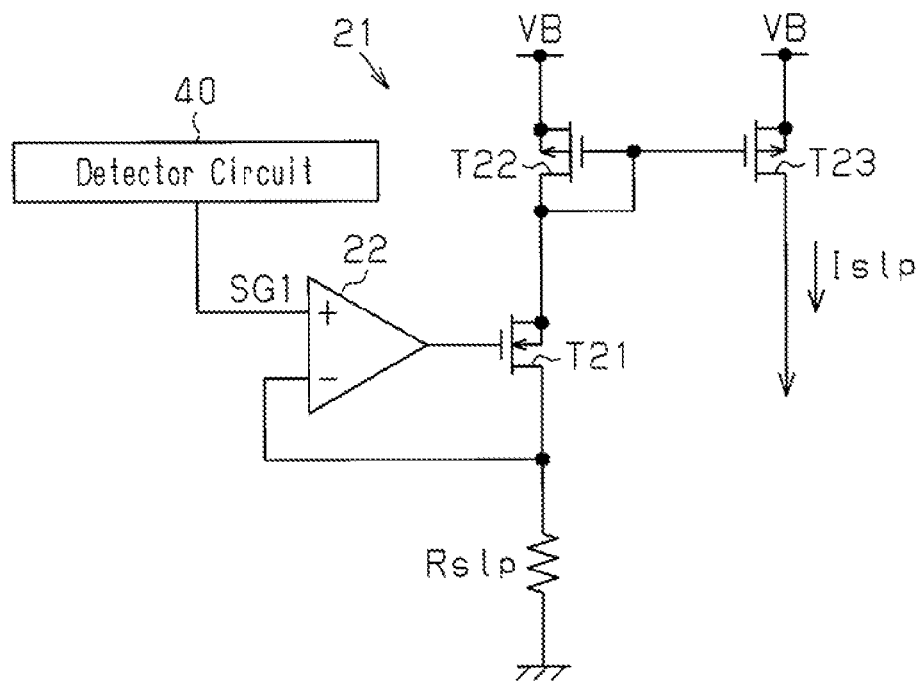
FIG. 6 is a circuit diagram illustrating a configuration example of a current source.

Next, a configuration example of the current source 21 in the reference voltage generation circuit 20 is described with reference to FIG. 6.

The control signal SG1 from the detector circuit 40 is supplied to a non-inverting input terminal of an operational amplifier 22. An output terminal of the operational amplifier 22 is coupled to a gate of an N-channel MOS transistor T21. A drain of the transistor T21 is coupled to a drain of a P-channel MOS transistor T22, and a source thereof is coupled to an inverting input terminal of the operational amplifier 22 and a first terminal of a resistor Rslp. A second terminal of the resistor Rslp is coupled to the ground GND.

The operational amplifier 22 controls the transistor T21 such that a voltage at the inverting input terminal is equal to the voltage value V6 of the control signal SG1. That is, the voltage at the first terminal of the resistor Rslp is controlled to be the voltage value V6 of the control signal SG1. Accordingly, a current corresponding to a resistance value of the resistor Rslp and a potential difference (voltage value V6) between the both terminals flows between the both terminals of the resistor Rslp. In this way, the voltage value of the control signal SG1 is converted into a current in the operational amplifier 22 and the resistor Rslp.

The transistor T22 has the bias voltage VB supplied to a source thereof and a gate thereof is coupled to the drain of the transistor T22 and a gate of a P-channel MOS transistor T23.

The bias voltage VB is supplied to a source of the transistor T23. Accordingly, the transistors T22, T23 function as a current mirror circuit. The current mirror circuit causes the current Islp proportional to a current flowing in the resistor Rslp to flow in the transistor T23 according to electric characteristics of the both transistors T22, T23.

A drain of the transistor T23 is coupled to the first terminal of the capacitor C3 illustrated in FIG. 1 and the current Islp expressed by the following equation is supplied to the capacitor C3.

$$Islp = \frac{V6}{Rslp} \quad (10)$$

$$Islp = A1 \times A2 \times A3 \times C41 \times R41 \times \frac{Ron}{Rslp} \times \frac{Vi - Vo}{L}$$

At this time, a slope amount Vslp of a slope generated by the current Islp may be expressed as follows from the second term of the right side of equation (3).

$$Vslp = \frac{Islp}{C3} \times Toff \quad (11)$$

$$Vslp = A1 \times A2 \times A3 \times \frac{C41}{C3} \times \frac{R41 \times Ron}{Rslp} \times Toff \times \frac{Vi - Vo}{L}$$

$$Vslp = \alpha \times \frac{Vi - Vo}{L}$$

where $$\alpha = A1 \times A2 \times A3 \times \frac{C41}{C3} \times \frac{R41 \times Ron}{Rslp} \times Toff$$

By generating the current Islp according to the slope of the coil current IL in this way, the slope amount Vslp of the slope added to the standard voltage VR0 changes in reverse proportion to the inductance value L of the coil L1. That is, the detector circuit 40 and the current source 21 function as a circuit for adjusting the slope amount Vslp (rate of change) of the slope. For example, as illustrated in FIG. 4, the control signal SG1 generated by the detector circuit 40 is low when the output current Io is small and the slope of the coil current IL is small (see left part). Thus, the current Islp generated by the current source 21 also becomes smaller and the slope amount Vslp generated by the current Islp also becomes smaller. Conversely, when the output current Io is large and the slope of the coil current IL is large (see right part), the control signal SG1 generated by the detector circuit 40 becomes higher. Thus, the current Islp generated by the current source 21 also becomes larger and the slope amount Vslp generated by the current Islp also becomes larger.

Figure 7:
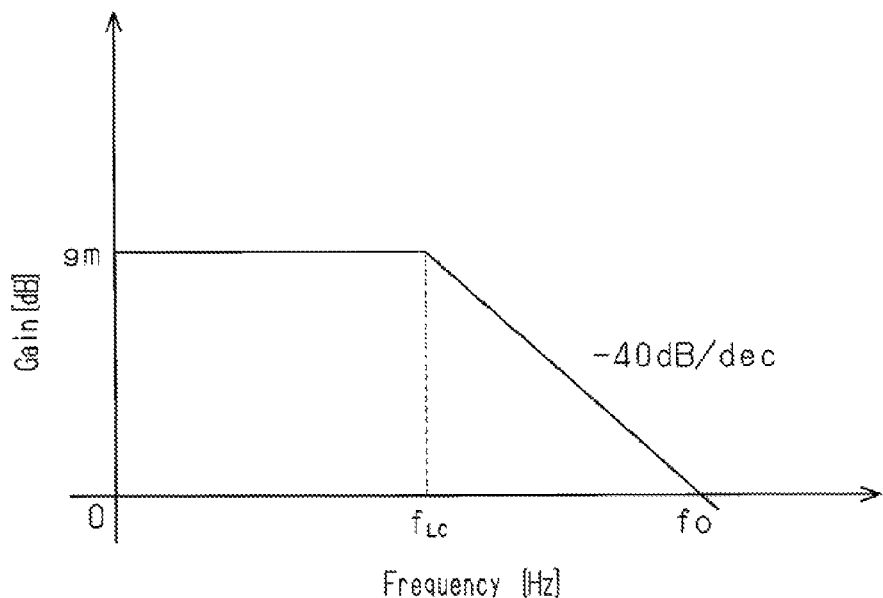
FIG. 7 is a characteristic diagram illustrating a frequency characteristic of the DC-DC converter.
Figure 8:
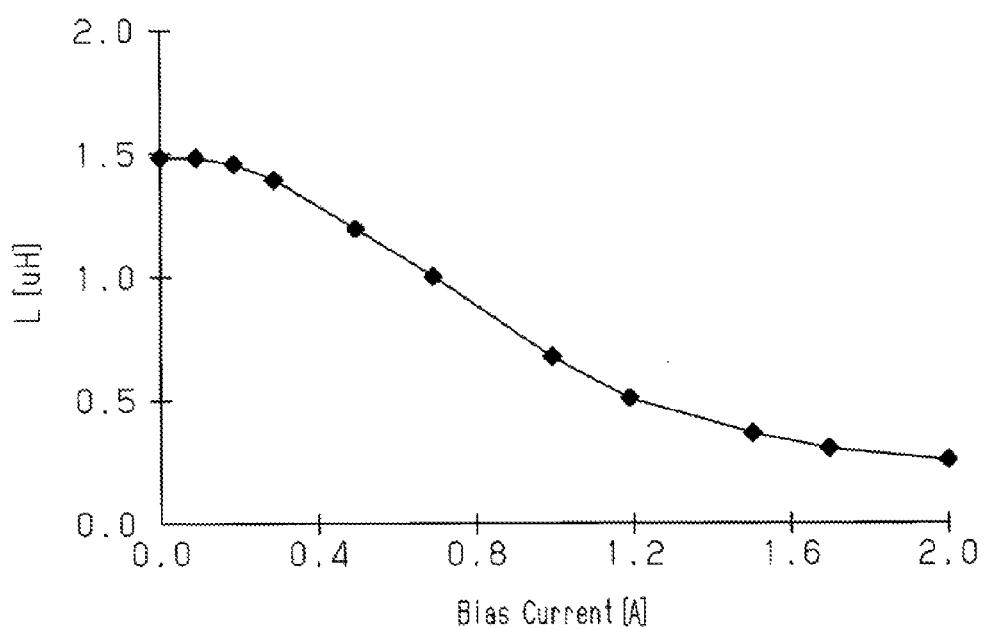
FIG. 8 is a characteristic diagram illustrating a direct-current superposition characteristic of a coil.
Figure 9:
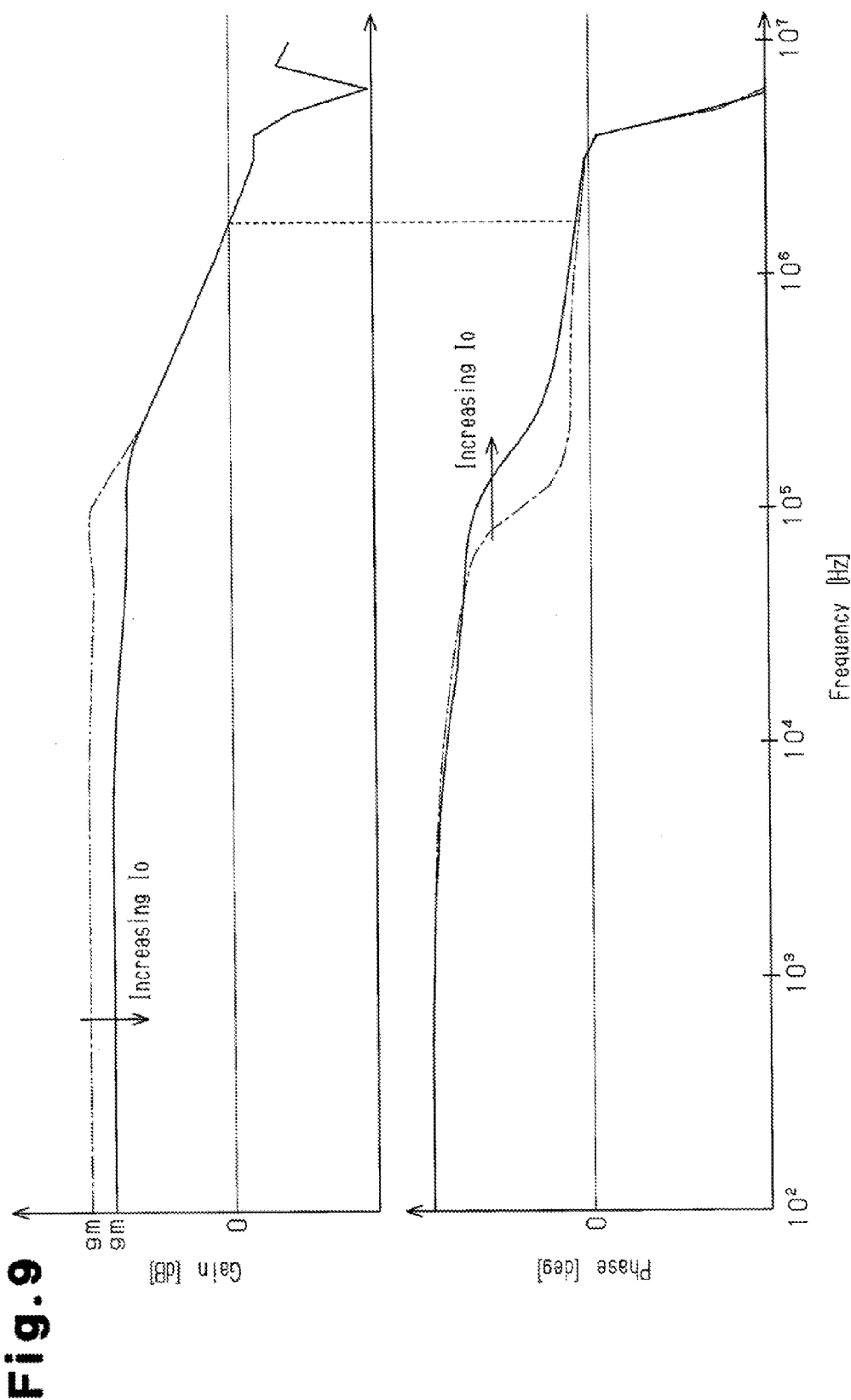
FIG. 9 is a characteristic diagram illustrating frequency characteristics of the DC-DC converter of the one embodiment.
Figure 10:
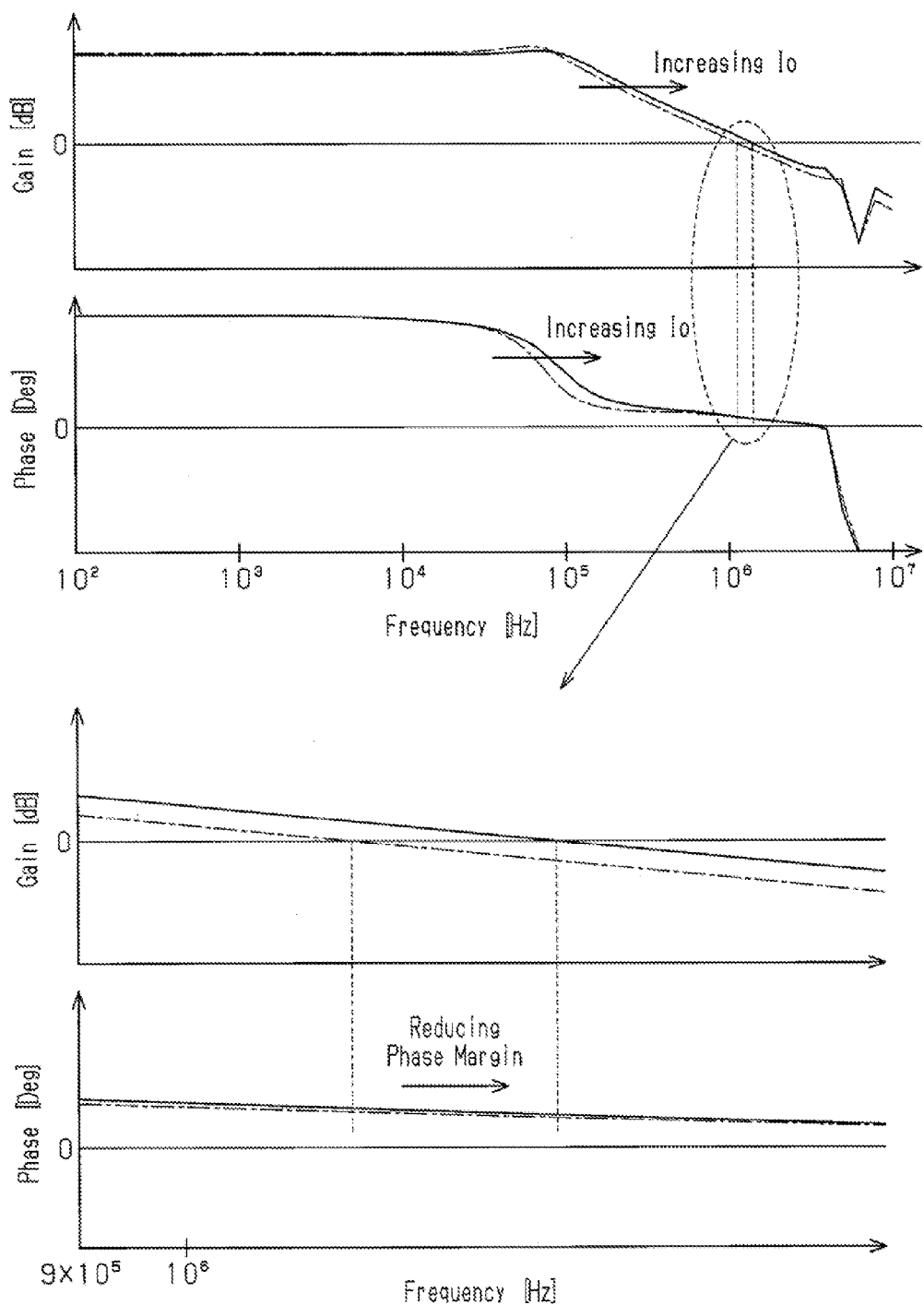
FIG. 10 is a characteristic diagram illustrating frequency characteristics of a DC-DC converter of FIG. 15, FIGS. 11A and 11B are characteristic diagrams illustrating changes in frequency characteristics when an output current was changed.
Figure 15:
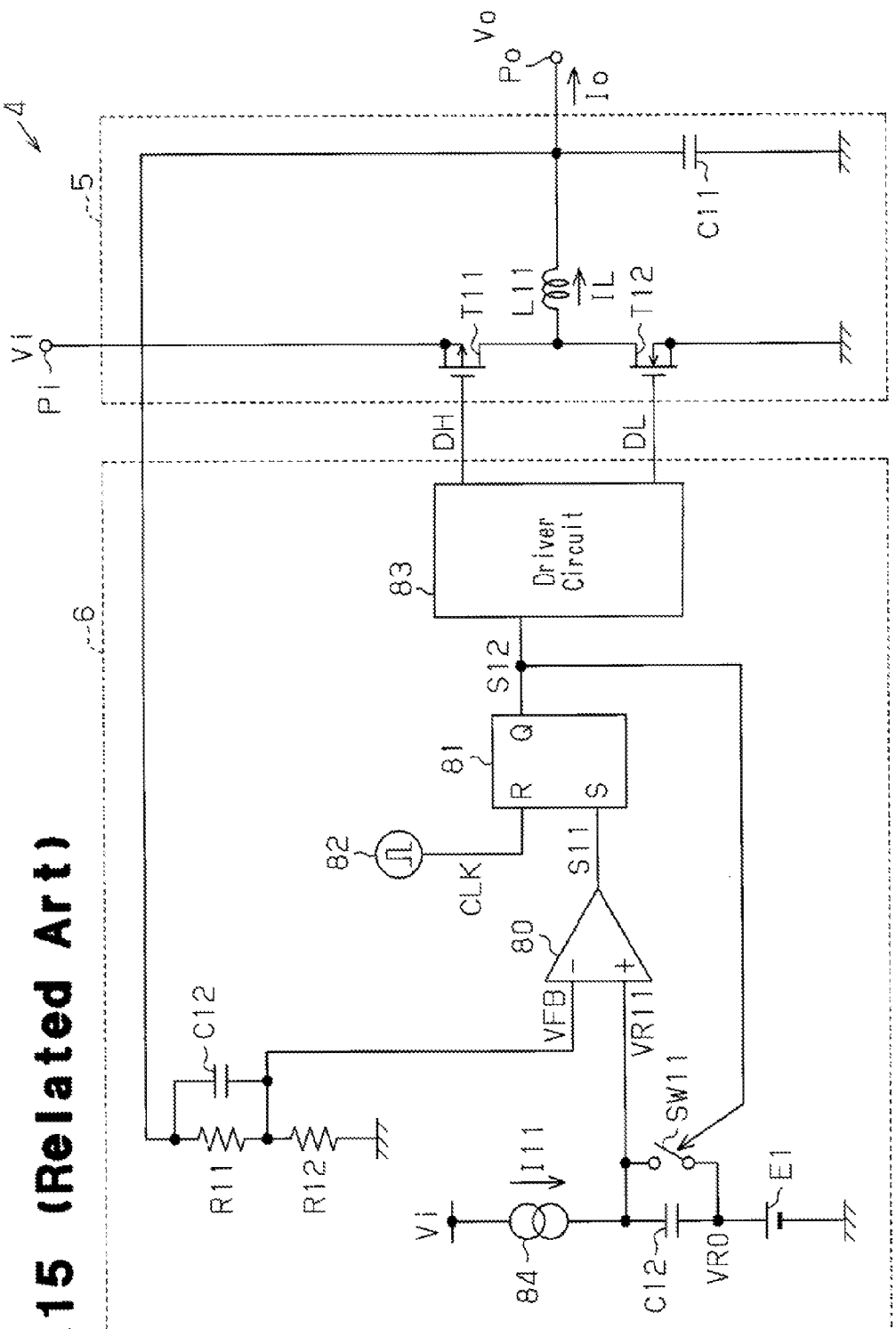
FIG. 15 is a block circuit diagram illustrating a DC-DC converter according to related art.

Next, the function of the DC-DC converter 1 (particularly, reference voltage generation circuit 20 and detector circuit 40) is described with reference to FIGS. 7 to 11 in comparison to a comparative example, which is the DC-DC converter 4 of FIG. 15. FIG. 7 illustrates a gain curve representing a change in a gain of a negative feedback loop of the DC-DC converter 1 in relation to frequency. FIG. 9 illustrates a simulation result of frequency characteristics of the DC-DC converter 1 of the embodiment, and FIG. 10 illustrates a simulation result of frequency characteristics of the comparative example DC-DC converter 4 of FIG. 15. FIG. 11 illustrates a simulation result of changes of the frequency characteristics when the output current Io is changed.

First, the gain of the negative feedback loop and a crossover frequency of the DC-DC converter 1 are described with reference to FIG. 7. The gain of the negative feedback loop of the DC-DC converter 1 is proportional to the input voltage Vi and inversely proportional to the slope amount Vslp of the reference voltage VR1. Accordingly, a gain at a frequency of 0 Hz may be expressed as follows when gm denotes the gain at that time.

$$gm = \frac{Vi}{Vslp} \quad (12)$$

A frequency at which the gain is 0 dB, i.e. a crossover frequency fo may be expressed as follows.

$$fo = \sqrt{gm} \times f_{LC} \quad (13)$$

A resonance frequency $f_{LC}$ of the coil L1 and the capacitor C1 may be expressed as follows if C denotes a capacitance value of the capacitor C1.

$$f_{LC} = \frac{1}{2\pi\sqrt{LC}} \quad (14)$$

Thus, the crossover frequency fo may be expressed as follows from equations (12) to (14).

$$fo = \sqrt{\frac{Vi}{Vslp}} \times \frac{1}{2\pi\sqrt{LC}} \quad (15)$$

$$fo^2 = \frac{Vi}{Vslp} \times \frac{1}{4\pi^2 LC}$$

Figure 11A:
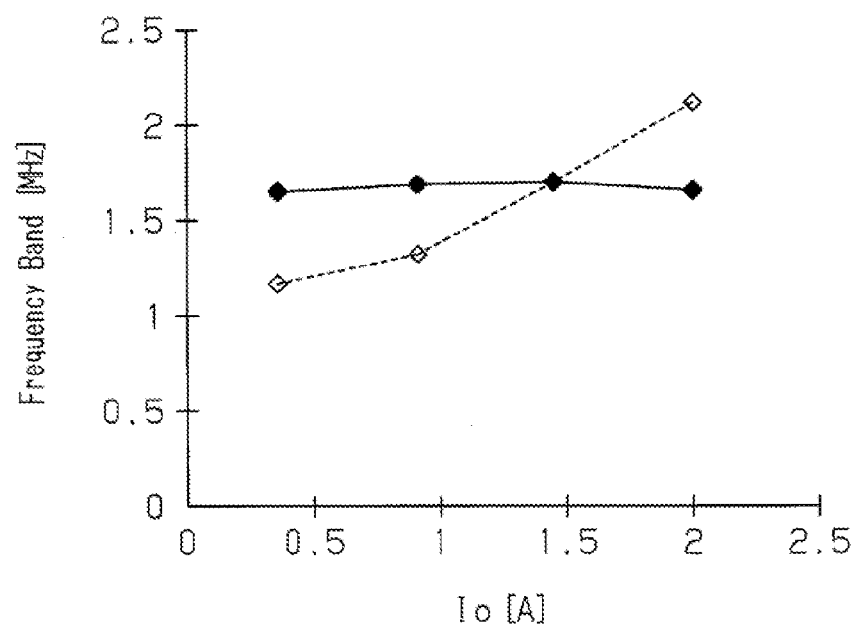
Figure 11B:
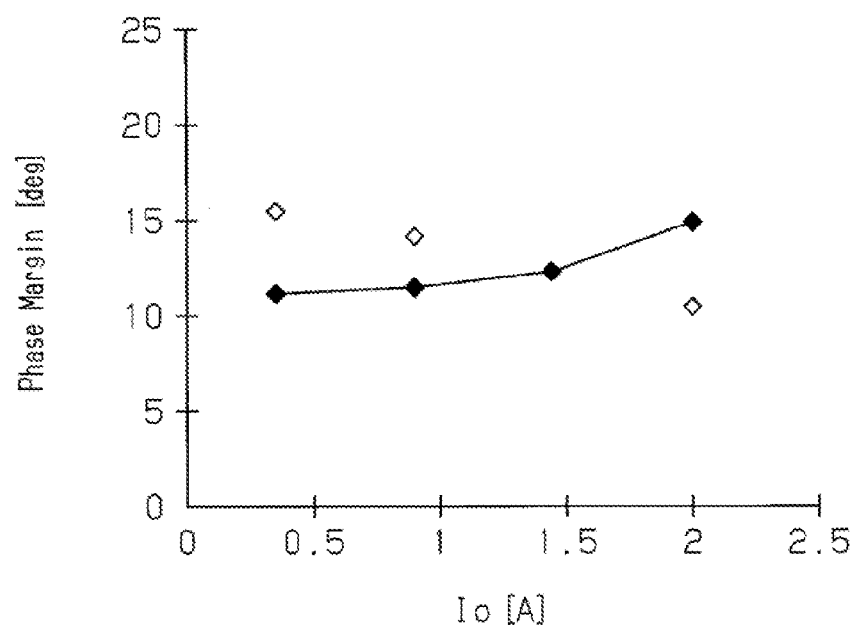

As is clear from equations (14) and (15), the crossover frequency fo increases and the resonance frequency $f_{LC}$ increases if the inductance value L of the coil L1 decreases. If the coil L1 is a multilayer chip coil, a direct-current superposition characteristic is poor (low), wherefore the inductance value L changes due to a variation of a bias current flowing in the coil L1. For example, as illustrated in FIG. 8, the inductance value L of the coil L1 decreases as the bias current increases. Thus, if the output current Io increases, for example, according to a variation of a load, a current flowing in the coil L1 increases and the inductance value L of the coil L1 decreases. At this time, if the slope of the reference voltage VR11 is constant, for example, as in the comparative example DC-DC converter 4, the crossover frequency fo increases, i.e. the crossover frequency fo (frequency band) spreads toward a high-frequency side as the inductance value of the coil L1 decreases as illustrated by dashed-dotted line of FIG. 10. Then, as illustrated in an enlarged view of FIG. 10, the phase at the crossover frequency fo spread toward the high-frequency side decreases, wherefore a phase margin becomes smaller. That is, as illustrated in FIG. 11, in the DC-DC converter 4 of FIG. 15, the crossover frequency fo increases (see broken line of FIG. 11A) and the phase margin becomes smaller (see broken line of FIG. 11B) as the output current Io increases. In this way, a problem that the DC-DC converter tends to oscillate and the operation thereof becomes unstable if the output current Io increases occurs in the DC-DC converter 4 of FIG. 15.

On the contrary, in the DC-DC converter 1 of the embodiment, the slope amount Vslp of the reference voltage VR1 is changed according to the inductance value L of the coil L1. The detector circuit 40 and the reference voltage generation circuit 20 adjust the slope amount Vslp so that the crossover frequency fo (frequency band) becomes substantially constant regardless of a variation of the inductance value L of the coil L1. For example, the detector circuit 40 and the reference voltage generation circuit 20 maintain the crossover frequency fo substantially constant by feeding back the inductance value L of the coil L1 and adjusting the slope of the reference voltage VR1 according to the inductance value L to adjust the slope amount Vslp. The details will be described. If the output current Io increases according to a variation of a load, the current flowing in the coil L1 increases and the inductance value L of the coil L1 decreases as described above. In association with this, the slope of the coil current IL during the ON-period of the transistor T1 increases. Then, the voltage value V6 of the control signal SG1 generated in the detector circuit 40 increases and the current value of the current Islp generated by the current source 21 also increases. This causes an increase in the slope of the reference voltage VR1 and an increase in the slope amount Vslp. In association with this, the gain gm decreases as illustrated in FIG. 9. In this way, the spread of the crossover frequency fo toward the high-frequency side with the decreasing inductance value L of the coil L1 is suppressed and the crossover frequency fo is maintained substantially constant. As a result, even if the inductance value L of the coil L1 decreases with the increasing output current Io, a reduction of the phase margin may be suppressed. As just described, in the DC-DC converter 1 of the embodiment, the crossover frequency fo is maintained substantially constant (see solid line of FIG. 11A) and a reduction of the phase margin is suppressed (see solid line of FIG. 11B) even if the output current Io increases as illustrated in FIG. 11. The result of the simulation indicates that the phase margin increased as the output current Io increased. This is thought to be because an attenuation coefficient $\zeta$ increased and the slope of a phase curve decreased due to the variation of the load that increased the output current Io.

It is described using equations that the crossover frequency fo may be maintained substantially constant.

Similar to the above description, a slope Slp1 of the coil current IL during the ON-period of the transistor T1 is as follows when the inductance value L of the coil L1 decreases with the increasing output current Io.

$$Slp1 = \frac{Vi - Vo}{L - \Delta L} \quad (16)$$

In the equation, $\Delta L$ denotes a reduction of the inductance value L. The voltage value V6 of the control signal SG1 generated by detecting such a slope Slp1 is as follows from equation (9).

$$V6 = A1 \times A2 \times A3 \times C41 \times R41 \times Ron \times \frac{Vi - Vo}{L - \Delta L} \quad (17)$$

The current Islp generated from the control signal SG1 is as follows from equation (10).

$$Islp = A1 \times A2 \times A3 \times C41 \times R41 \times \frac{Ron}{Rslp} \times \frac{Vi - Vo}{L - \Delta L} \quad (18)$$

The slope amount Vslp of the slope generated from the current Islp is as follows from equation (11).

$$Vslp = \alpha \times \frac{Vi - Vo}{L - \Delta L} \quad (19)$$

where $$\alpha = A1 \times A2 \times A3 \times \frac{C41}{C3} \times \frac{R41 \times Ron}{Rslp} \times Toff$$

Thus, the crossover frequency fo is as follows from equation (15).

$$fo = \frac{Vi}{\frac{Vi - Vo}{L - \Delta L} \times \alpha} \times \frac{1}{4\pi^2 (L - \Delta L)C} \quad (20)$$

$$fo = \frac{Vi}{Vi - Vo} \times \frac{1}{4\pi^2 C \times \alpha}$$

That is, the inductance value L of the coil L1 is canceled out from the equation expressing the crossover frequency fo by feeding back the inductance value L of the coil L1 and adjusting the slope amount Vslp of the reference voltage VR1. Thus, the crossover frequency fo may be maintained substantially constant regardless of a variation of the inductance value L of the coil L1. In this way, a reduction of the phase margin may be suppressed even if the inductance value L of the coil L1 decreases with the increasing output current Io.

If the input voltage Vi and the output voltage Vo satisfy a relationship of equation (21) as in the embodiment, they may be approximated as expressed in equation (22).

$$Vi >> Vo \quad (21)$$

$$Vi - Vo \approx Vi \quad (22)$$

Thus, the crossover frequency fo may be approximated as follows.

$$fo \approx \frac{Vi}{Vi} \times \frac{1}{4\pi^2 C \times \alpha} \quad (23)$$

$$fo \approx \frac{1}{4\pi^2 C \times \alpha}$$

That is, the input voltage Vi is also canceled out from the equation expressing the crossover frequency fo and the crossover frequency fo may be maintained substantially constant regardless of a variation of the input voltage Vi. In this way, a reduction of the phase margin may be suppressed even if the input voltage Vi varies.

In the embodiment, the DC-DC converter 1 is an example of a power supply device, the transistor T1 is an example of a switch circuit, the capacitor C3 and the switch circuit SW1 are an example of a voltage adding circuit, and the comparator 10, the RS-FF circuit 50, the oscillator 60 and the driver circuit 70 are an example of a control unit. The detector circuit 40 and the current source 21 are an example of a slope adjustment circuit. The output terminal Po is an example of an output terminal. The amplifier circuit 41 is an example of a first amplifier. The amplifier circuit 43 is an example of a second amplifier. The amplifier circuit 46 is an example of a third amplifier. The resistor R42 and the capacitor C43 are an example of a low-pass filter. The current source 21 is an example of a current conversion circuit.

The present embodiment has the advantages described below.

(1) The slope amount Vslp of the slope of the reference voltage VR1 is adjusted based on a differentiation result of the coil current IL (slope of the coil current IL). By this, the slope amount Vslp of the reference voltage VR1 may be inversely proportional to the inductance value L of the coil L1. Thus, the inductance value L of the coil L1 is canceled out from the equation expressing the crossover frequency fo. Accordingly, the crossover frequency fo (frequency band) may be maintained substantially constant regardless of a variation of the inductance value L of the coil L1 and a reduction of the phase margin caused by a reduction of the inductance value L may be suppressed. As a result, a wider bandwidth may be achieved even in a low current range while the phase margin is ensured.

Figure 12A:
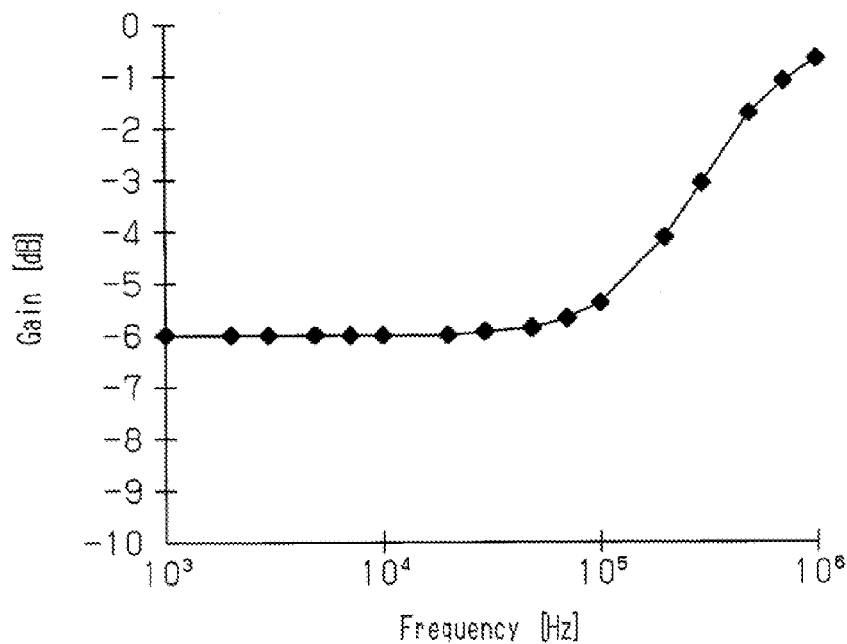
FIGS. 12A and 12B are characteristic diagrams illustrating frequency characteristics of the DC-DC converter of the one embodiment.
Figure 12B:
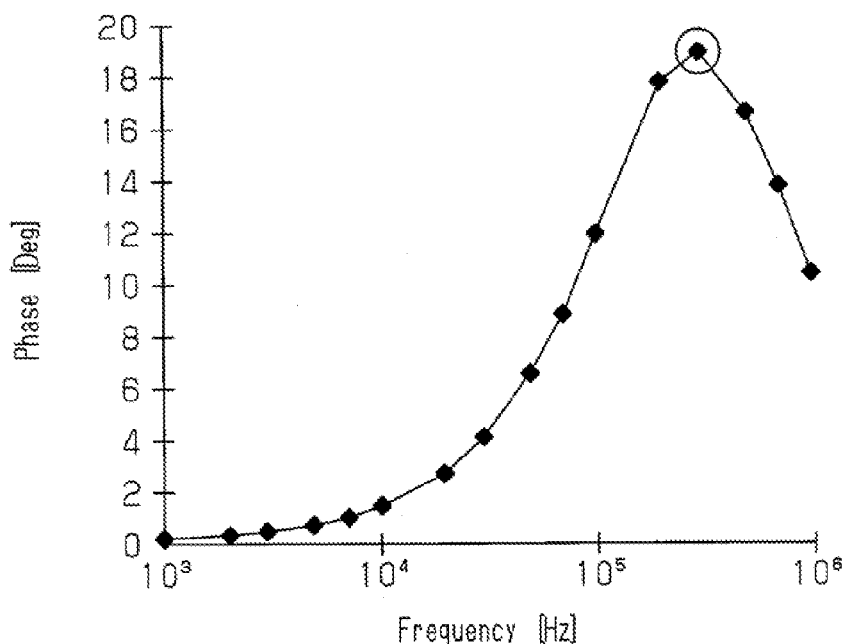

(2) If the crossover frequency fo (frequency band) may be fixed, a sufficient effect of phase compensation by the capacitor C2 may be obtained. For example, the phase compensation by the capacitor C2 is limited to a narrow frequency range as illustrated in FIGS. 12A and 12B. A sufficient phase margin may be ensured and a sufficient effect of phase compensation by the capacitor C2 may be obtained by aligning the crossover frequency fo with a local maximum point (see a circle) of a phase curve illustrated in FIG. 12B. However, if the crossover frequency fo varies according to a variation of the inductance value L of the coil L1 (variation of the output current Io) as in the DC-DC converter 4 of FIG. 15, the crossover frequency fo deviates from the above local maximum point, wherefore the effect of phase compensation by the capacitor C2 may not be sufficiently obtained. On the contrary, the crossover frequency fo may be maintained substantially constant regardless of a variation of the inductance value L of the coil L1 in the DC-DC converter 1 of the embodiment, wherefore a deviation of the crossover frequency fo from the above local maximum point may be suppressed and a sufficient effect of phase compensation by the capacitor C2 may be obtained. It is easily designed to align the crossover frequency fo with the above local maximum point.

(3) The slope was detected by differentiating the coil current IL during the ON-period of the transistor T1 and the slope amount Vslp of the slope of the reference voltage VR1 was adjusted based on the detection result. By this, the slope amount Vslp of the reference voltage VR1 may be proportional to the input voltage Vi. Thus, a variation of the crossover frequency fo according to a variation of the input voltage Vi may be preferably suppressed.

It should be apparent to those skilled in the art that the present invention may be embodied in many other specific forms without departing from the spirit or scope of the invention. Particularly, it should be understood that the present invention may be embodied in the following forms.

In the embodiment, the integration circuit 45 of the detector circuit 40 may be omitted.

In the embodiment, the capacitor C2 may be omitted.

In the embodiment, the slope of the coil current IL during the ON-period of the transistor T1 was detected in the detector circuit 40. Without being limited to this, the slope of the coil current IL during the OFF-period of the transistor T1 may be, for example, detected in the detector circuit 40. Even with such a configuration, the slope amount Vslp may be inversely proportional to the inductance value L of the coil L1 by generating the slope of the reference voltage VR1 according to the slope of the coil current IL detected in the detector circuit 40.

Although the amplifier circuit 41 was discussed as an example of a circuit for detecting the coil current IL in the embodiment, the circuit is not particularly limited provided that it may detect the coil current IL. For example, a sensing resistor for sensing a current may be coupled in a stage subsequent to the coil L1 and the coil current IL may be detected by detecting a potential difference between both ends of the sensing resistor. A resistor and a capacitor may be coupled in parallel to the coil L1 and the coil current IL may be detected by DCR (equivalent direct-current resistance) sensing.

Figure 13:
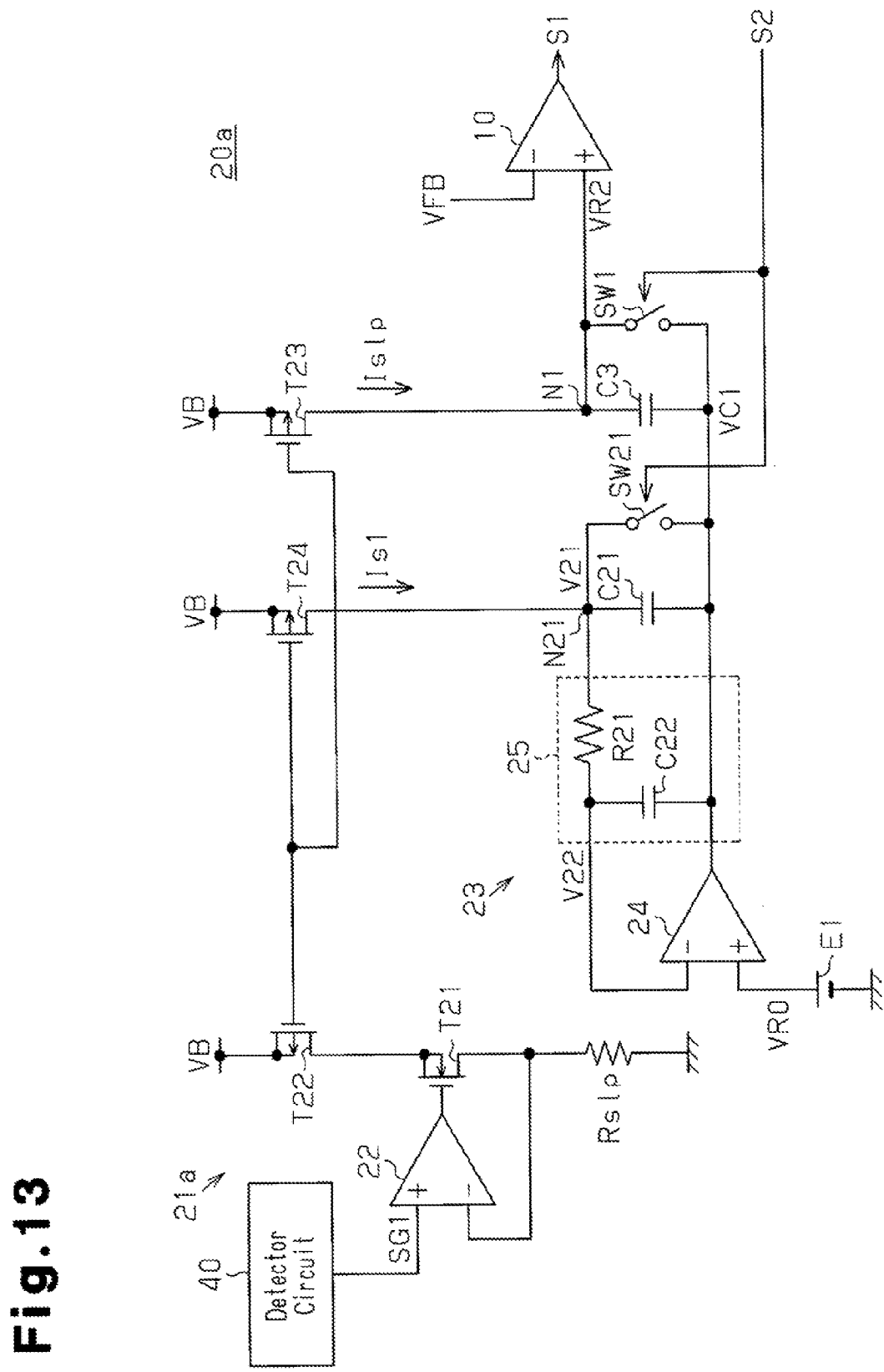
FIG. 13 is a circuit diagram illustrating a reference voltage generation circuit of a modification.

In the embodiment, a method for generating the reference voltage VR1 is not particularly limited. For example, a reference voltage generation circuit 20a as illustrated in FIG. 13 may be adopted.

The reference voltage generation circuit 20a includes a current source 21a, a capacitor C3, a switch circuit SW1 and a correction voltage generation circuit 23. In the reference voltage generation circuit 20a, a voltage to which a slope generated by a current Islp supplied from the current source 21a and the capacitor C3 is added is changed from a standard voltage VR0 to a correction voltage VC1. That is, the reference voltage generation circuit 20a differs from the previous reference voltage generation circuit 20 (see FIG. 1) in that the correction voltage generation circuit 23 for generating the correction voltage VC1 is added. The same members as those illustrated in FIGS. 1 and 6 are denoted by the same reference signs and respective elements thereof are not described in detail.

In the current source 21a, a current Is1 is supplied to the correction voltage generation circuit 23 from a P-channel MOS transistor T24 coupled to a transistor T22 in a current-mirror manner. In an embodiment, electrical characteristics of transistors T22 to T24 are so set that the current Is1 is twice as large as the current Islp.

The correction voltage generation circuit 23 includes capacitors C21, C22, a resistor R21, a switch circuit SW21, an operational amplifier 24 and a standard power supply E1. A first terminal of the capacitor C21 is coupled to a drain of the transistor T24 and a second terminal thereof is coupled to an output terminal of the operational amplifier 24. The switch circuit SW21 is coupled in parallel to the capacitor C21. The switch circuit SW21 is, for example, an N-channel MOS transistor. A source and a drain of the switch circuit SW21 are respectively coupled to the both terminals of the capacitor C21, and an output signal S2 is supplied to a gate thereof. That is, the capacitor C21 and the switch circuit SW21 are coupled in the same manner as the capacitor C3 and the switch circuit SW1. A capacitance value of the capacitor C21 is set to be equal to that of the capacitor C3. Thus, the capacitor C21 stores electric charges corresponding to the current Is1 during an OFF-period of the switch circuit SW21 (OFF-period of the transistor T1).

The electric charges stored in the capacitor C21 increase with a gradient corresponding to the current Is1 from a reset voltage (here, output voltage of the operational amplifier 24) during the OFF-period of the switch circuit SW21 and are discharged until the reset voltage is reached by turning on the switch circuit SW21 in one switching cycle. At this time, since the current Is1 is twice as large as the current Islp, a potential difference between the both terminals of the capacitor C21 is twice as large as a potential difference between the both terminals of the capacitor C3. That is, a voltage V21 at the first terminal (node N21) of the capacitor C21 has a slope waveform which changes at a slope which is twice as large as the slope of the reference voltage VR1.

The first terminal of the capacitor C21 is also coupled to a first terminal of the resistor R21. A second terminal of the resistor R21 is coupled to a non-inverting input terminal of the operational amplifier 24 and a first terminal of the capacitor C22. A second terminal of the capacitor C22 is coupled to the output terminal of the operational amplifier 24.

A low-pass filter 25 including the resistor R21 and the capacitor C22 smoothes the voltage V21 by electric charges stored in the capacitor C21. Accordingly, a potential difference between the both terminals of the capacitor C22 is half the potential difference between the both terminals of the capacitor C21, i.e. a value equal to a potential difference between the both terminals of the capacitor C3.

The operational amplifier 24 changes an output voltage (correction voltage VC1) such that the voltage V22 on a coupling point between the resistor R21 and the capacitor C22 becomes equal to the standard voltage VR0 generated in the standard power supply E1.

A slope is superposed on the thus generated correction voltage VC1 to generate a reference voltage VR2, which is supplied to a non-inverting input terminal of a comparator 10.

In the embodiment, the feedback voltage VFB was a voltage obtained by superposing the alternating-current component of the output voltage Vo to the divided voltage obtained by dividing the output voltage Vo by the resistors R1, R2 through the capacitor C2. Without being limited to this, the feedback voltage VFB may be, for example, the output voltage Vo itself.

Although the output signal S2 was supplied to the switch circuit SW1 coupled in parallel to the capacitor C3 for generating a slope in the embodiment, it is not particularly limited provided that it is a signal corresponding to the ON-period or the OFF-period of the main transistor T1. For example, it may be the control signal DH, DL or a voltage at the node N1.

In the embodiment, the transistor T1 was turned off in accordance with the H-level clock signal CLK that rises with a certain period. Without being limited to this, the transistor T1 may be turned off, for example, after the elapse of a certain time after a rise timing of the signal S1 output from the comparator 10 (ON-timing of the transistor T1). In this case, a timer circuit which outputs an H-level pulse signal to the reset terminal R of the RS-FF circuit 50 after the elapse of a time dependent on the input voltage Vi or the output voltage Vo from the rise timing of the signal S1 may be provided, for example, instead of the oscillator 60. Alternatively, a one-shot flip-flop circuit may be provided instead of the RS-FF circuit 50 and the oscillator 60.

Although the P-channel MOS transistor T1 was discussed as an example of the switch circuit in the embodiment, an N-channel MOS transistor may be used. A bipolar transistor may be used as the switch circuit. Alternatively, a switch circuit including a plurality of transistors may be used.

The standard voltage VR0 may be generated outside the control circuit 3.

The transistors T1, T2 in the embodiment may be included in the control circuit 3. The converter unit 2 may be included in the control circuit 3.

Although a synchronous rectification type DC-DC converter is discussed in the embodiment, it may be embodied as a non-synchronous rectification type DC-DC converter.

The embodiment discusses the DC-DC converter that compares the feedback voltage VFB and the reference voltage VR1 and sets the ON-timing of the main transistor T1 according to the comparison result. Without being limited to this, the embodiment may be embodied as a DC-DC converter which compares the feedback voltage VFB and the reference voltage VR1 and sets the OFF-timing of the main transistor T1 according to the comparison result.

Figure 14:
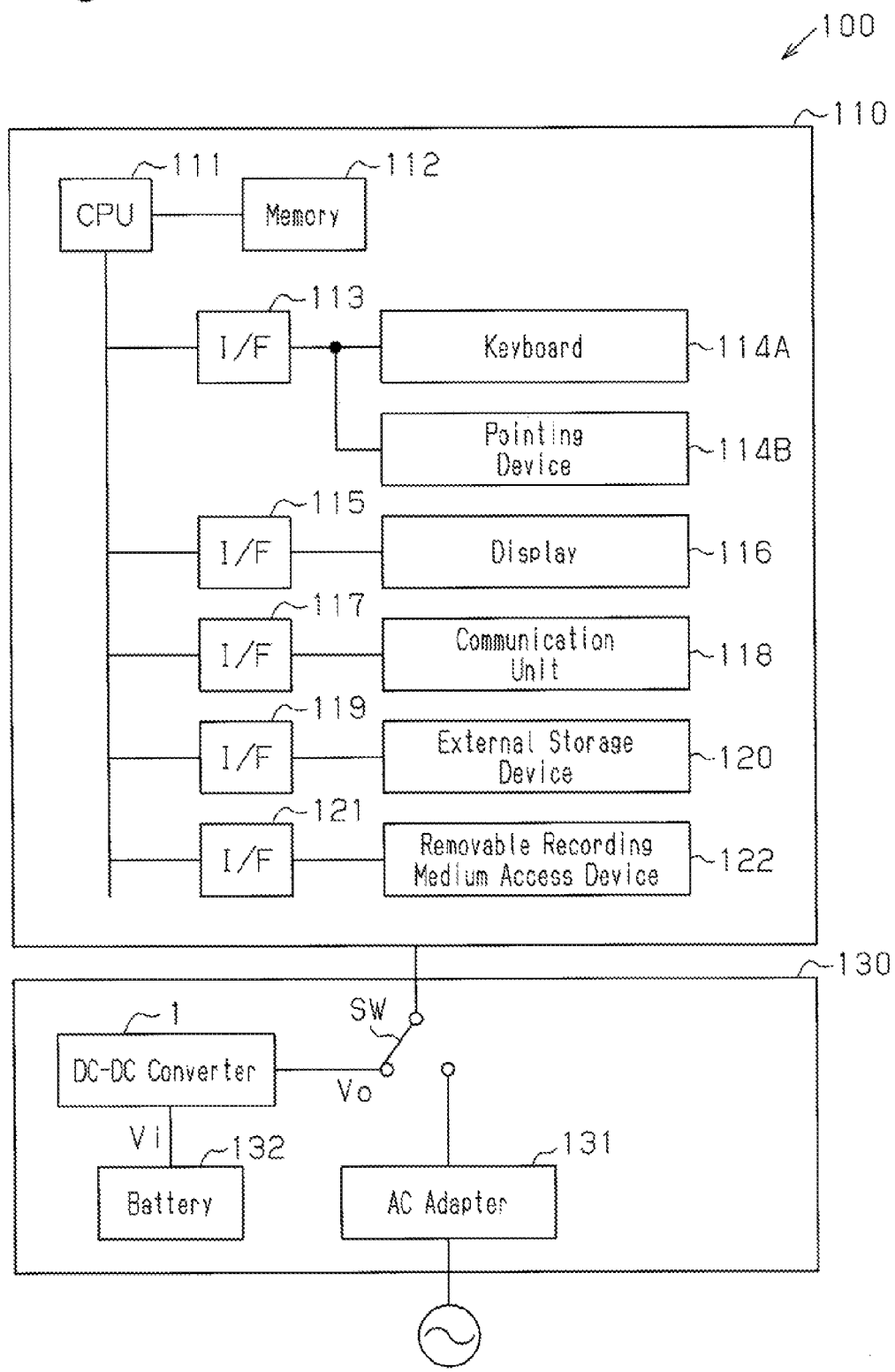
FIG. 14 is a schematic configuration diagram illustrating an electronic device.

FIG. 14 illustrates an example of an electronic device 100 with the DC-DC converter 1. The electronic device 100 includes a main unit 110 and a power supply unit 130 for supplying power to the main unit 110. The main unit 110 is an example of an internal circuit.

First, the main unit 110 is described. To a central processing unit (CPU) 111 which executes a program is coupled a memory 112 for storing the program to be executed by the CPU 111 or data to be processed by the CPU 111. A keyboard 114A and a pointing device 114B are coupled to the CPU 111 via an interface (I/F) 113. The pointing device 114B is, for example, a mouse, a trackball, a flat device such as a touch panel or a capacitive sensor or the like.

A display 116 is coupled to the CPU 111 via an interface 115 and a communication unit 118 is coupled thereto via an interface 117. The display 116 is, for example, a liquid crystal display, an electroluminescence panel or the like. The communication unit 118 is, for example, a local area network board or the like.

To the CPU 111 are further coupled an external storage device 120 via an interface 119 and a removable recording medium access device 122 via an interface 121. The external storage device 120 is, for example, a hard disk. A removable recording medium to be accessed by the access device 122 is, for example, a CD (Compact Disc), a DVD (Digital Versatile Disk), a flash memory card or the like.

Next, an internal configuration example of the power supply unit 130 is described.

The DC-DC converter 1 and an alternating-current adapter 131 are coupled to the main unit 110 via a switch SW. Power is supplied to the main unit 110 from either one of the DC-DC converter 1 and alternating-current adapter 131. The DC-DC converter 1, for example, converts an input voltage Vi from a battery 132 into an output voltage Vo and supplies the output voltage Vo to the main unit 110 in the example of FIG. 14.

Such an electronic device may be a notebook personal computer, a communication device such as a mobile phone, an information processing device such as a personal digital assistance (PDA), a video device such as a digital camera or a video camera, a receiver such as a television device, or the like.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment of the present invention has been described in detail, it should be understood that the various changes, substitutions, and alterations could be made hereto without departing from the spirit and scope of the invention.

What is claimed is:

1. A power supply device, comprising:
a switch circuit to which an input voltage is supplied;
a coil coupled between the switch circuit and an output terminal from which an output voltage is outputted;
a voltage adding circuit that adds a slope voltage to a reference voltage;
a control unit that compares a feedback voltage corresponding to the output voltage and the reference voltage and switches the switch circuit at a timing corresponding to a comparison result of the feedback voltage and the reference voltage; and
a slope adjustment circuit that differentiates a current flowing in the coil and adjusts a slope amount of the slope based on a differentiation result of the current.

2. The power supply device according to claim 1, wherein the slope adjustment circuit includes:

a first amplifier that converts the current flowing in the coil into a voltage;

a differentiating circuit that differentiates an output voltage of the first amplifier;

a second amplifier that amplifies an output of the differentiating circuit; and a hold circuit that holds an output voltage of the second amplifier.

3. The power supply device according to claim 2, wherein the slope adjustment circuit includes:

a third amplifier that amplifies an output voltage of the hold circuit; and a low-pass filter that reduces noise of an output voltage of the third amplifier.

4. The power supply device according to claim 2, wherein the slope adjustment circuit includes a current conversion circuit that converts an output voltage of the hold circuit into a current.

5. The power supply device according to claim 3, wherein the slope adjustment circuit includes a current conversion circuit that converts an output voltage of the low-pass filter into a current.

6. The power supply device according to claim 1, wherein the slope adjustment circuit adjusts the slope amount of the slope based on the differentiation result of the current flowing in the coil during a period in which the switch circuit is on.

7. A control circuit for a power supply, comprising:

a voltage adding circuit that adds a slope voltage to a reference voltage;

a control unit that compares a feedback voltage corresponding to an output voltage of the power supply and the reference voltage and switches a switch circuit, to which an input voltage of the power supply is supplied, at a timing corresponding to a comparison result of the feedback voltage and the reference voltage; and a slope adjustment circuit that differentiates a current flowing in a coil coupled between the switch circuit and an output terminal from which the output voltage of the power supply is outputted and adjusts a slope amount of the slope based on a differentiation result of the current.

8. An electronic device comprising:

a power supply including a control circuit; and an internal circuit to which an output voltage of the power supply is supplied, wherein the control circuit includes:

a voltage adding circuit that adds a slope voltage to a reference voltage;

a control unit that compares a feedback voltage corresponding to the output voltage of the power supply and the reference voltage and switches a switch circuit, to which an input voltage of the power supply is supplied, at a timing corresponding to a comparison result of the feedback voltage and the reference voltage; and a slope adjustment circuit that differentiates a current flowing in a coil coupled between the switch circuit and an output terminal from which the output voltage of the power supply is outputted and adjusts a slope amount of the slope based on a differentiation result of the current.

9. A method for controlling a power supply outputting an output voltage, the comprising:

adding a slope voltage to a reference voltage;

comparing a feedback voltage corresponding to the output voltage of the power supply and the reference voltage;

switching a switch circuit, to which an input voltage of the power supply is supplied, at a timing corresponding to a result of the comparing;

differentiating a current flowing in a coil coupled between the switch circuit and an output terminal from which the output voltage of the power supply is outputted; and adjusting a slope amount of the slope based on a differentiation result of the current.

* * * * *